Aug. 26, 1941.                C. E. LOMAX                2,253,937
                                CONVERTER
                          Filed Oct. 21, 1938            2 Sheets-Sheet 1
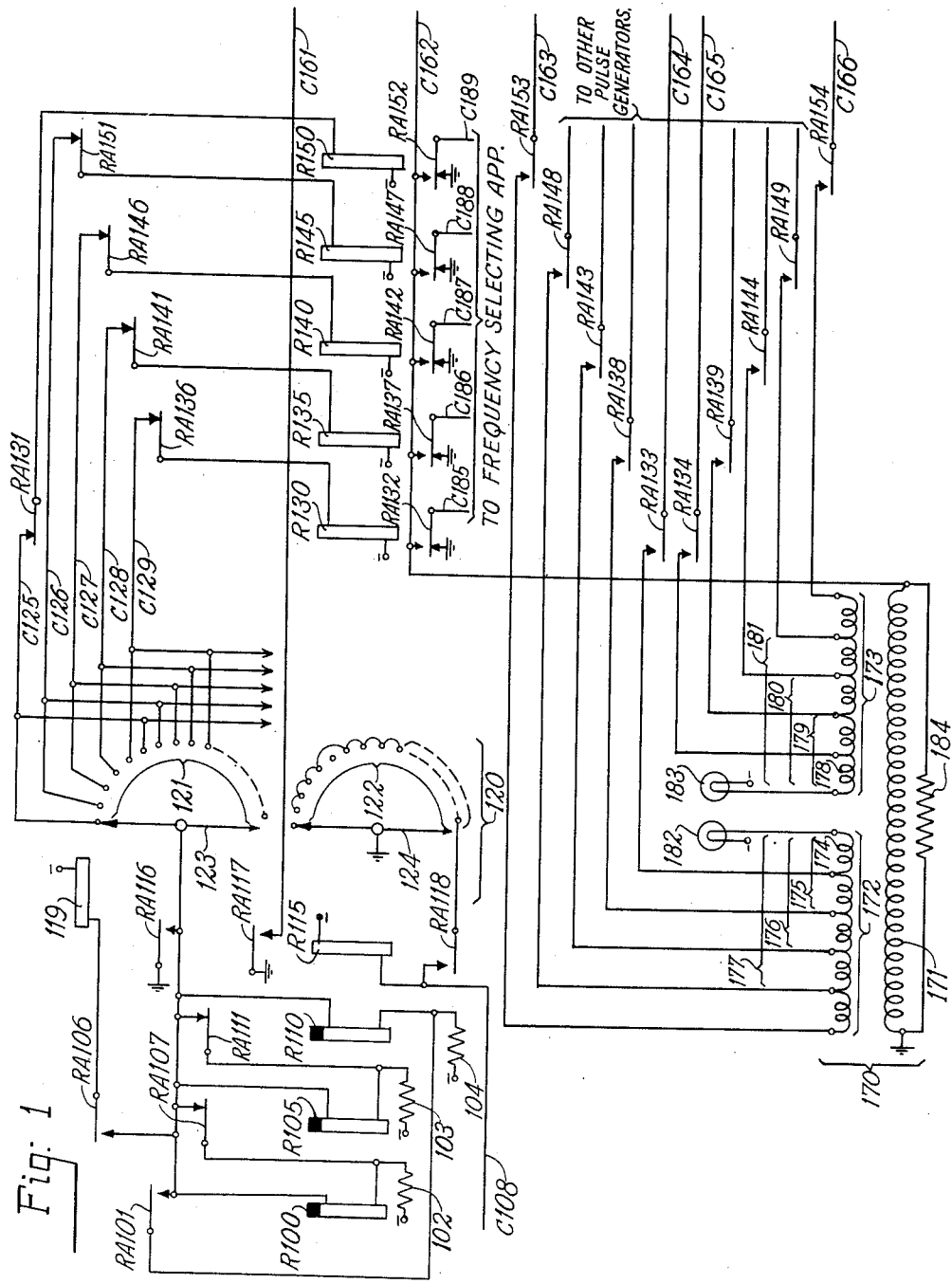
INVENTOR.
Clarence E. Lomax
BY Davis, Lindsey, Smith & Shouts
ATTORNEYS.

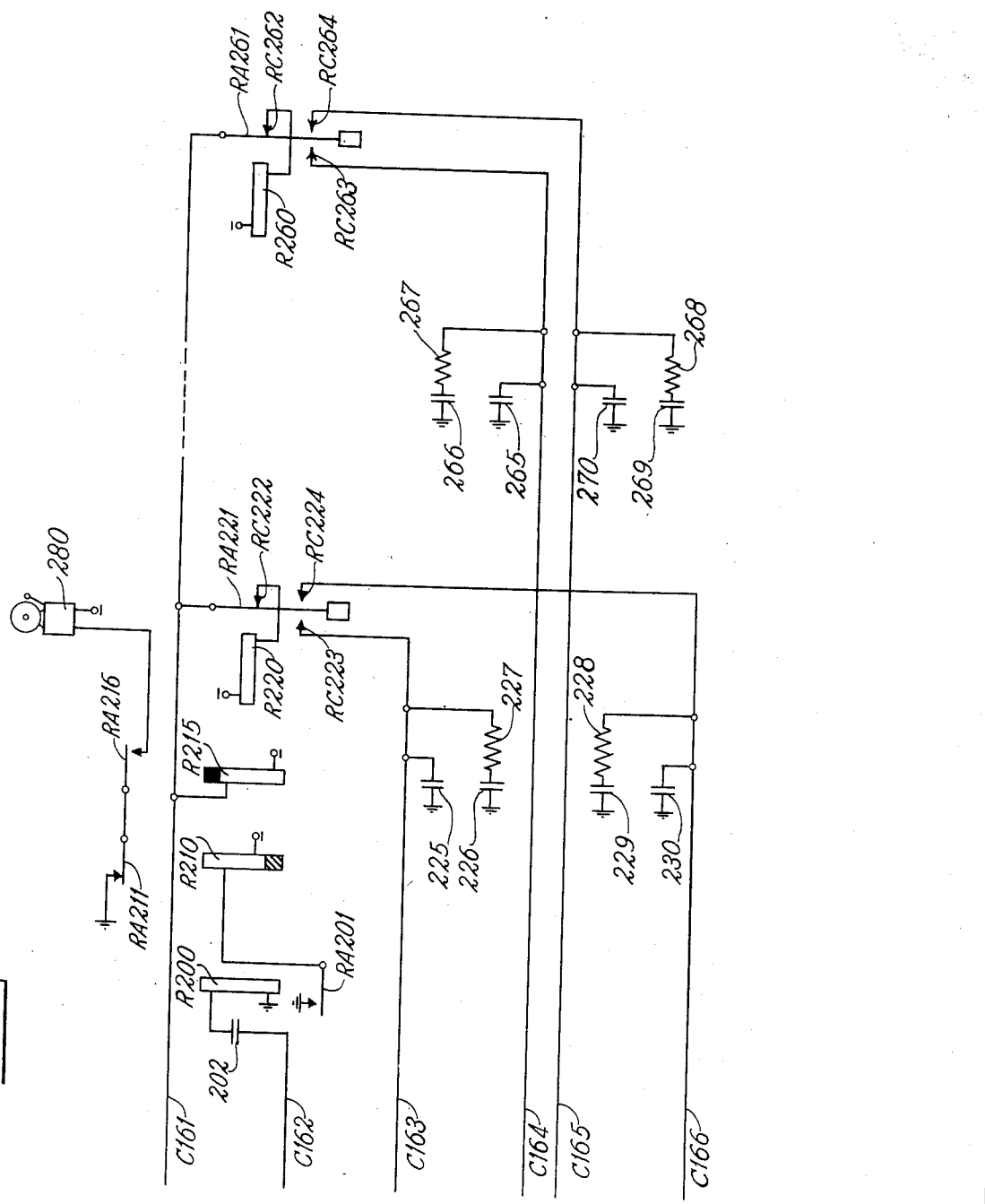

Patented Aug. 26, 1941

2,253,937

UNITED STATES PATENT OFFICE 2,253,937

CONVERTER

Clarence E. Lomax, Oak Park, Ill., assignor to Associated Electric Laboratories, Inc., Chicago, Ill., a corporation of Delaware Application October 21, 1938, Serial No. 236,187

13 Claims. (Cl. 179—87)

The present invention relates to apparatus for converting direct current into alternating current and, more particularly, to improvements in converters of the character utilized to provide ringing current of different frequencies for signaling over the lines of a telephone system.

Usually the converting apparatus provided in a telephone exchange, for the purpose of providing ringing currents of different frequencies, comprises a plurality of individual converters each having a different output frequency, together with a cyclically operating interrupter switch which functions periodically to connect the ringing or output current conductors, corresponding to the respective ringing frequencies, to the output terminals of the corresponding converters. While such arrangements are entirely satisfactory in operation, they are somewhat expensive to manufacture in that a considerable duplication of apparatus is necessary.

It is an object of the present invention to provide a converting arrangement of the character described which operates to provide a plurality of output frequencies in a positive, reliable and improved manner, and includes a minimum amount of circuit apparatus.

It is another object of the invention to provide improved apparatus of the character described wherein a single transformer is utilized successively to deliver output currents of the different generated frequencies.

It is a further object of the invention to provide in apparatus of the character described, an improved interrupter arrangement which operates in a positive and reliable manner periodically to connect the output current conductors to the converter output terminals, and also to determine the output frequency of the converter.

It is a still further object of the invention to provide, in conjunction with converting apparatus of the character described, an improved alarm circuit arrangement which operates in a positive and reliable manner to give an alarm when the converting apparatus fails to operate.

The invention is illustrated as being embodied in converting apparatus which comprises a transformer having a secondary winding and a pair of primary windings, and a plurality of direct current pulse generators having different pulse periodicities. There is also provided an interrupter comprising a plurality of relays individually corresponding to the pulse generators and operative to connect the primary windings of the transformer to the corresponding generators, together with a cyclically operating switch for causing the sequential operation of the relays. Each of the pulse generators, when connected to the primary windings of the transformer, is operative to cause alternate current pulses to traverse alternate ones of the primary windings in directions such that an alternating voltage is developed across the transformer secondary winding. Thus, a single transformer is utilized in converting the direct current pulses of each of the pulse generators into alternating voltages having frequencies corresponding to the output periodicities of the pulse generators, and the sequentially operating relays embodied in the interrupter function to determine the output frequency of the converter. More particularly described, the primary windings of the transformer are adapted to be connected to the respective pulse generators through the provision of a plurality of paths each including at least a portion of one or the other of the primary windings and having impedance constants which vary inversely in accordance with the periodicities of the generators to which the paths respectively extend. The improved alarm circuit arrangement which operates in conjunction with the converter comprises an alarm device having an operating circuit, together with a relay connected to be energized by the alternating voltage developed across the secondary winding of the above-mentioned transformer and means controlled by the relay for completing the operating circuit of the alarm device only when the direct current pulse generators are operating and no alternating voltage is developed across the transformer secondary winding.

Further features of the invention pertain to the particular arrangement of the circuit elements whereby the above and additional operating features are attained.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Figures 1 and 2 considered together illustrate converting apparatus having embodied therein the features of the invention as briefly outlined above.

Referring now to the drawings, the converter there illustrated comprises a transformer 170 including a secondary winding 171 shunted by a damping resistor 184, and a pair of primary windings 172 and 173 which are adapted to be successively connected to different ones of a plurality of direct current pulse generators through the sequential operation of a plurality of ringing or interrupter relays R130, R135, R140, R145 and R150. The direct current pulse generators are in the form of vibratory or pole changing relays, two thereof being indicated at R220 and R260, respectively. These relays individually comprise weighted or pendulum armatures which function to determine the periodicity of vibration of the associated relays, and the different ones of the relays are constructed and arranged to have different periodicities of vibration corresponding to the desired different output frequencies of the apparatus. With the arrangement illustrated, it is contemplated that five relays, including the two relays R220 and R260, shall be provided for supplying the direct current pulses of different periodicities to the primary windings of the transformer 170. These relays may have vibrating characteristics such that the relay R220 vibrates at a frequency of sixteen cycles per second, the relay R260 vibrates at a frequency of sixty-six cycles per second, and the other three relays vibrate at intermediate frequencies of twenty-five, thirty-three and fifty-four cycles per second, respectively. For the purpose of matching the impedances of the primary windings 172 and 173 to the different pulse frequencies, these windings are tapped and different portions thereof are arranged to be connected to the respective pulse generators. For example, the winding 172 may be considered as comprising four lesser portions 174, 175, 176 and 177, which portions are arranged to be connected to the respective pulse generators in the inverse order of their enumeration and in the order of increasing pulse periodicities. Thus, when the vibratory relay R220 is connected to deliver pulses to the winding 172, the whole of this winding is included in the pulsing circuit. Similarly, when the vibratory relay having the next lower pulse periodicity is connected to deliver pulses to the winding 172, the portion 177 of this winding is included in the pulsing circuit. Finally, when the vibratory relay R260 having the highest pulse periodicity is connected to deliver pulses to the winding 172, only the portion 174 of this winding is included in the pulsing circuit. In a similar manner the other primary winding 173 is divided into a plurality of portions 178, 179, 180 and 181 of increasing impedance, which portions are arranged successively to be included in the associated pulsing circuit in the order of decreasing pulse frequency. The two pulsing circuits, by way of which different portions of the two primary windings 172 and 173 are energized, each include a device having a substantial positive current coefficient of resistance, which devices are provided for the purpose of protecting the pole changing contacts of the pulsing relays against damage due to arcing caused by heavy overloads. Thus, the different branches of the circuit for energizing the primary winding 172 commonly include a lamp 182, and the different branches of the circuit for energizing the winding 173 commonly include a second lamp 183. The two lamps 182 and 183 may, for example, be 100 watt, 32 volt, tungsten lamps having a hot to cold resistance ratio of approximately 10:1.

In order to protect the pole changing contacts of the vibratory relays against sparking during the break periods thereof and against fusion or burning during the make periods thereof, there is provided in shunt with each set of contacts an energy absorbing circuit connected and arranged in accordance with the invention disclosed in copending application Serial No. 236,195, filed October 21, 1938, now Patent No. 2,225,687, granted December 24, 1940 to Irvin W. Cox. In brief, each such absorption circuit comprises a plurality of paths each including capacitance and individually having different time constants. For example, the circuit provided in shunt with the contacts RC223 of the relay R220 and the associated contact carried by the vibratory armature RA221, comprises a path including a capacitor 225 and having an exceedingly small time constant, and a second path comprising a second capacitor 226 connected in series with a resistor 227 and having a relatively large time constant. In a similar manner there is provided in shunt with the contact RC224 and the associated contact carried by the armature RA221, two paths which respectively comprise a capacitor 230, and a capacitor 229 connected in series with a resistor 228. Again the contact RC263 embodied in the relay R220 and the associated contact carried by the armature RA261 are shunted by two paths having different time constants, the one of these paths having the small time constant comprising a capacitor 265, and the path having the larger time constant comprising a capacitor 266 connected in series with a resistor 267. Finally, the contact RC264 and the associated contact carried by the armature RA261 are shunted by a first path having a small time constant and comprising a capacitor 270 and by a second path having a larger time constant and comprising a capacitor 269 connected in series with a resistor 268. Preferably the capacitance of each of the condensers 225, 230, 265, 270, etc., is relatively small as compared with the capacitance of the condensers 226, 229, 266, 269, etc., and the paths respectively including the same are substantially free from resistance. The resistance values of each of the resistors 227, 228, 267, 268, etc., are chosen to provide the required time constants of the paths respectively including the same.

The ringing or interrupter relays R130, R135, R140, R145 and R150 not only function to determine the output frequency of the converter but also control the connection of the ringing or output current conductors to the high potential terminal of the transformer secondary winding 171. More particularly, there are provided five output current conductors C185, C186, C187, C188 and C189 individually corresponding to the five frequencies and adapted successively to be connected to the high potential terminal of the winding 171 through operation of the relays R130, R135, R140, R145 and R150, respectively. During the intervals when the indicated relays are restored, the respective output current conductors are connected to ground in the manner illustrated. The low potential terminal of the winding 171 is also grounded, a ground return path being utilized in completing the circuit for conducting current through the load device connected to any selected one of the output current conductors.

For the purpose of successively energizing the enumerated ringing or interrupter relays, there is provided cyclically operating means comprising a rotary switch 120 and three slow-to-operate control relays R100, R105 and R110 arranged to operate in a cyclic manner. The switch 120 is of the well-known rotary type and comprises two sets of bank contacts 121 and 122 each including twenty-five contacts, two wipers 123 and 124 respectively associated with the enumerated contact sets, and an operating magnet 119 for driving the indicated wipers over the contacts of their respective associated sets. In order to initiate the operation of the apparatus thus far described, there is also provided a start relay R115 which is operative in response to the application of ground potential to the start conductor C108.

In order to give an alarm in case the converting apparatus fails properly to respond to the operation of the start relay R115, there is provided an improved alarm circuit arrangement which comprises an alarm device in the form of a bell 280 and three relays R200, R210 and R215, the second-mentioned of which is of the slow-to-release type, and the last-mentioned of which is of the slow-to-operate type. The relay R200 is an alternating current relay and is connected in series with a condenser 202 across the secondary winding 171 of the transformer 170 to be energized by alternating voltages appearing across this winding.

Referring now more particularly to the operation of the apparatus, when ground potential is impressed upon the start conductor C108, the start relay R115 is energized and operates to prepare, at RA118, a circuit traced hereinafter for maintaining itself energized until one cycle of operation of the interrupter relays is completed. At RA116, the relay R115 completes a circuit for energizing the relay R150, this circuit extending from ground at RA116 by way of the wiper 123, C125, RA131, and the winding of R150 to battery. When energized over this circuit the relay R150 operates to open, at RA151, a point in the operating circuit, traced hereinafter, for the second interrupter relay R145. At RA152 and its associated resting contact, the relay R150 disconnects the ringing or output current conductor C189 from ground. At RA152 and its associated working contact, the relay R150 connects the conductor C189 to the conductor C162 extending to the high potential terminal of the transformer secondary winding 171. At RA153 and RA154, the relay R150 prepares the circuits for respectively energizing the primary windings 172 and 173 of the transformer 170 in accordance with alternate ones of the direct current pulses generated through operation of the vibratory relay R220.

When the start relay R115 operates, it also functions to complete the respective start circuits for the vibratory relays R220, R260, etc., and to complete the circuit for energizing the slow-to-operate control relay R215. More particularly, the indicated relays are energized over a circuit extending from ground at RA117 and by way of C161, one branch of the circuit extending through the winding of R215 to battery, a second branch of the circuit extending by way of RA221, RC222, and the winding of R220 to battery, and a third branch of the circuit extending by way of RA261, RC262, and the winding of R260 to battery. Other branches of this circuit similarly extend through the winding of each of the other vibratory relays. When energized over this circuit, the indicated vibratory relays start to operate. Thus, the relay R220, when energized over the circuit just traced, attracts its weighted armature RA221 and in so doing moves the armature out of engagement with the contact RC222 and into engagement with the contact RC223. When the weighted armature RA221 is disengaged from the contact RC222, the circuit for energizing the winding of the relay R220 is broken, permitting the weighted armature to swing back through its normal position to again engage the contact RC222 and thus recomplete the circuit for energizing the winding of R220. During its backstroke the armature RA221 also engages the contact RC224. When the armature RA221 re-engages the contact RC222 to recomplete the circuit for energizing the winding of R220, the armature is again attracted and the cycle of operations just described is repeated. Thus, the weighted armature RA221 is caused alternately to engage its associated contacts RC223 and RC224, the periodicity of vibration of this armature being determined by the natural period of vibration of the armature. In a similar manner, the armature RA261 embodied in the relay R260 starts vibrating alternately to engage its two associated contacts RC263 and RC264 in response to operation of the start relay R115.

With the start relay R115 operated and the armature RA221 of the vibratory relay R220 vibrating between its two extreme positions, the two primary windings 172 and 173 of the transformer 170 are alternately energized by pulses of direct current. More specifically, each time the armature RA221 engages its associated contact RC223, the winding 172 is energized over a circuit extending from the positive terminal of the current supply battery by way of RA117, C161, RA221, RC223, C163, RA153, the whole of the winding 172, and the filament of the lamp 182 to the negative terminal of the current supply battery. The build-up of current resulting from the completion of this circuit is gradual, due to the inductance included in the circuit, and causes an induced voltage of one polarity to be developed across the secondary winding 171 of the transformer 170. At approximately the instant the current traversing the winding 172 reaches its maximum value, the armature RA221 is moved out of engagement with the contact RC223 and the circuit just traced is broken. The current traversing the winding 172 now starts to decrease. At approximately the instant the current through the winding 172 reaches a zero value, the armature RA221 engages its associated contact RC224 to cause a pulse of direct current to traverse the other primary winding 173. The circuit over which the last-mentioned winding is energized may be traced as extending from ground at RA117 by way of C161, RA221, RC224, C166, RA154, the whole of the winding 173 and the filament of the lamp 183 to battery. The build-up of current resulting from the completion of this circuit is also gradual, due to the inductance included in the circuit, and causes an induced voltage to be developed across the secondary winding 171 having a polarity opposite to that of the voltage pulse resulting from the current pulse delivered to the winding 172 in the manner just described. At approximately the instant the current traversing the winding 173 reaches its maximum value, the armature RA221 is moved out of engagement with the contact RC224 to break the circuit for energizing the winding 173 and the current traversing the last-mentioned winding gradually decreases to a zero value. From the foregoing it will be apparent that, during continued vibration of the relay R220, alternate direct current pulses are delivered to alternate ones of the windings 172 and 173 with the result that an alternating voltage having a frequency corresponding to the periodicity of vibration of the armature RA221 is developed across the secondary winding 171. With the relay R150 operated, this voltage is impressed upon the output current conductor C199. This alternating voltage also results in the energization of the alternating current relay R200 over a circuit including the conductor C162 and the condenser 202. The relay R200 now operates to complete, at RA201, an obvious circuit for energizing the slow-to-release relay R210. The relay R210, in turn, operates to open, at RA211, a point in the circuit for energizing the alarm device 280. Shortly following the operation of the relay R210, the slow-to-operate relay R215 operates to prepare, at RA216, a point in the circuit for energizing the alarm device 280. Thus, it will be apparent that if the apparatus is operating properly, the two relays R200 and R210 cooperate to prevent the alarm device from being energized in response to operation of the relay R215.

As indicated previously, during operation of the vibratory relay R220 to supply direct current pulses to the two windings 172 and 173 of the transformer 170, the previously referred to energy absorbing circuits function to protect the contacts of the relay R220 against damage. Considering the contact RC223 and the associated contact carried by the armature RA221 by way of example, it will be noted that, when the circuit for delivering pulses by way of these contacts to the winding 172 is prepared at the armature RA153 of the relay R150, but is open at the indicated contacts, the capacitor 225 is connected in series with the winding 172 and the filament of the lamp 182 across the current supply source. Under the conditions stated, the capacitor 226 is also connected across the energy supply source in series with the resistor 227, the winding 172, and the filament of the lamp 182. With these two condensers charged and when the armature RA221 is moved into engagement with the contact RC223, the condenser 225 is short-circuited, and the full charge thereof is dissipated as heat at the contact RC223 and the associated contact carried by the armature RA221. Since, however, the condenser 225 is relatively small, the charge of this condenser is also small and, hence, the energy dissipated at the contacts is considerably less than the amount required to cause fusion or burning of the contacts. The condenser 226 similarly starts to discharge during the instant of each make period when a point-to-point engagement is established between RA221 and the contact RC223. Since, however, the resistor 227 is included in the discharge path of the condenser 226, a large part of the energy accumulated in the condenser is dissipated in the resistor rather than at the contact points. Also, the energy stored in the condenser 226 is, due to the relatively large time constant of the path including this condenser, dissipated over a relatively long time interval as compared with the time required for the discharge of the condenser 225, and hence the heat generated at the relay contacts is more readily radiated. As a result the instantaneous total energy dissipation at the contact points is insufficient to cause fusion of the contacts. Thus, by providing the two paths having different time constants in shunt with the contact RC223 and the associated contact carried by RA221, these contacts are protected against burning or fusion during the make period thereof. It will be observed that, after the condensers 225 and 226 are discharged through engagement of RA221 with the contact RC223 in the manner just described, these condensers are effectively short-circuited and no energy is stored therein. During each break period of the contact RC223 and the associated contact carried by the armature RA221 and at the instant when the contacts are separated, the magnetic field developed in the winding 172 starts to collapse so that a counter E. M. F. or voltage is developed across the terminals of the winding 172 which is additive with respect to the voltage of the supply source. As this countervoltage builds up, the condensers 225 and 226 start to charge. Due to the relatively low time constant of the path including the condenser 225, this condenser absorbs the stored energy in the winding 172 during the initial movement of the armature RA221 away from the contact RC223. On the other hand, due to the relatively large time constant of the auxiliary path comprising the resistor 227, the condenser 226 is only partially charged when the smaller condenser 225 reaches its fully charged condition. Hence, the condenser 226 continues to absorb the transient energy developed in the winding 172 after the condenser 225 reaches its fully charged condition and during the continued movement of the armature RA221 away from the contact RC223. Thus, the stored energy in the winding 172 is effectively absorbed in the two paths shunting the contact RC223 and the associated contact carried by RA221 during the break periods of these contacts so that a minimum of sparking or arcing occurs. The manner in which the other energy absorbing circuits illustrated in the drawings function to protect the pole changing contacts respectively embodied in the two vibratory relays R220 and R260 is identical with that just described.

One of the factors influencing the operating conditions of the pole changing contacts respectively embodied in the vibratory relays is the load imposed upon the converter. Thus, if the impedance of the load connected across the secondary winding 171 is low, the current traversing each of the windings 172 and 173 during the periods when these windings are energized tends to be high, with the result that relatively large amounts of energy are stored in the two windings at the instants when the circuits for energizing the same are interrupted at the pole changing contacts. If the load is sufficiently heavy, this stored energy tends to exceed the energy storing capacity of the energy absorbing circuits and, hence, excessive sparking may occur at the pole changing contacts of the vibratory relays during the contact break intervals. In order to limit the current which may traverse the windings 172 and 173 and thus limit the energy which is stored in these windings when the respective energizing circuits are completed, the two lamps 182 and 183 are provided. Considering the lamp 182 by way of example, with this lamp serially included in the circuit for energizing the winding 172, it will be apparent that, as the current traversing this circuit starts to increase in average magnitude due to an increase in the load imposed upon the converter, the resistance of the lamp tends to rise and, upon rising, tends to lower the current. Thus, the lamp 182 functions to limit the current traversing the winding 172 and to restrict the amount of energy which may be stored in the winding during those instants when the circuit for energizing this winding is interrupted. In a similar manner, the lamp 183 functions to limit the current which may traverse the winding 173, and, thus, to restrict the amount of energy which may be stored in the last-mentioned winding. If desired, a single lamp may be substituted for the two lamps 182 and 183 without, in any way, altering the operation of the circuit. To this end, the two inner terminals of the windings 172 and 173 may be connected together and the junction therebetween connected through a single lamp to the negative terminal of the current supply source so that the lamp operates on both halves of each alternating current cycle.

When the start relay R115 operates in the manner explained above, it functions to initiate the cyclic operation of the three relays R100, R105 and R110, and the stepping operation of the rotary switch 120. Thus, upon operating, the relay R115 completes, at RA116, a circuit extending by way of the resistor 104 for energizing the winding of the slow-to-operate relay R110. The relay R110 operates an interval after this circuit is completed to open, at RA111, the path normally short-circuiting the winding of the relay R105, permitting the last-mentioned relay to be energized over a circuit extending from ground at RA116 and including the resistor 103. After a further interval, the relay R105 operates to open, at RA107, the path normally short-circuiting the winding of the relay R100, permitting the winding of the last-mentioned relay to be energized over a circuit also extending from ground at RA116 and including the resistor 102. The relay R100 now operates to complete, at RA101, an obvious path for short-circuiting the winding of the relay R110. When its winding is short-circuited, the relay R110 restores to recomplete, at RA111, the path for short-circuiting the winding of the relay R105, causing the last-mentioned relay to restore to recomplete, at RA107, the path for short-circuiting the winding of R100. The relay R100 now restores to open, at RA101, a point in the path for short-circuiting the relay R110, permitting the last-mentioned relay to again be energized in series with the resistor 104. Thus, a new cycle of operation of the three relays R110, R105, and R100 is initiated. The three indicated relays continue to operate in the cyclic manner just described so long as the start relay R115 is maintained in its operated position. During each cycle of operation thereof a circuit is completed for energizing the operating magnet 119 of the rotary switch 120, this circuit being completed in response to the operation of the relay R105 and extending from ground at RA116 by way of RA106 and the winding of the magnet 119 to battery. Each time this magnet is energized it operates to advance the wipers 123 and 124 one step. Hence, during each cycle of operation of the three relays R100, R105 and R110, the indicated wipers are operated one step.

When the wiper 123 is moved from engagement with its associated first contact and into engagement with its associated second contact, the previously traced operating circuit for the relay R150 is interrupted, and the operating circuit for the relay R145 is prepared. The relay R150 now restores to open, at RA153 and RA154, points in the above-traced circuits by way of which direct current pulses are delivered to the two primary windings 172 and 173 of the transformer 170 from the vibratory relay R220. At RA152 and its associated working contact, the relay R150, upon restoring, disconnects the output current conductor C188 from the high potential terminal of the secondary winding 171. At RA152 and its associated resting contact, the relay R150 connects the conductor C189 to ground. At RA151, the relay R150 completes the operating circuit for R145, which circuit may be traced as extending from ground at RA116 by way of the wiper 123 and its associated second contact, C126, RA151 and the winding of R145 to battery. The relay R145 now operates to complete, at RA148 and RA149, the respective circuits for delivering direct current pulses from the vibratory relay or pulse generator of next highest frequency to the two primary windings 172 and 173 of the transformer 170. It will be noted that these circuits respectively include only the portions 177 and 181 of the indicated primary windings, which portions individually have lower inductances than the whole of the windings 172 and 173. Thus, the impedance constants of the pulsing circuits are decreased to compensate for the increasing frequency, whereby the amplitudes of the current pulses of different periodicities are maintained substantially the same. At the break contacts associated with RA146, the relay R145 opens a point in the operating circuit for the third interrupter relay R140, thereby to prevent the last-mentioned relay from operating until after the relay R145 is restored. At RA147 and its associated resting contact, the relay R145 disconnects the output current conductor C188 from ground, while, at this same armature and its associated working contact, the relay R145 connects the conductor C188 to the high potential terminal of the secondary winding 171. Thus, when the relay R150 restores and the relay R145 operates, the output frequency of the converter is increased from the frequency corresponding to the periodicity of the vibratory relay R220 to the frequency corresponding to the periodicity of vibration of the next succeeding vibratory relay. During continued movement of the wipers 123 and 124 over the contacts of their respective associated sets, the remaining interrupter relays R140, R135 and R130 are sequentially energized. More specifically, when the wiper 123 is moved out of engagement with its associated second contact and into engagement with its associated third contact, the operating circuit for the relay R145 is interrupted, and the operating circuit for the relay R140 is prepared. The relay R145, upon restoring, disconnects the output current conductor C188 from the high potential terminal of the secondary winding 171, and interrupts the respective circuits over which direct current pulses are being delivered from the second pulse generator to the primary windings 172 and 173. At RA146, the relay R145 completes the operating circuit for the relay R140, causing the last-mentioned relay to operate and complete, at RA143 and RA144, the circuits for delivering direct current pulses from the third vibratory relay to the transformer primary windings 172 and 173. Upon operating, the relay R140 also opens, at RA141, a point in the operating circuit for the fourth interrupter relay R135. At RA142, the relay R140 disconnects the output current conductor C187 from ground and connects this conductor to the high potential terminal of the secondary winding 171. Thus, the output frequency of the converter is increased from the frequency corresponding to the periodicity of vibration of the second vibratory relay to the frequency corresponding to the periodicity of vibration of the third vibratory relay.

The manner in which the fourth and fifth interrupter relays R135 and R130 operate respectively to connect the fourth and fifth pulse generators to the primary windings of the transformer 170 and to connect the output current conductors C186 and C185, respectively, to the high potential terminal of the secondary winding 171 when the wiper 123 is successively moved into engagement with its associated fourth and fifth contacts, is identical with the mode of operation of the first three interrupter relays just described. The arrangement is such that a new cycle of operation of the interrupter relays is started following the operation and restoration of the fifth interrupter relay R130. To this end, the first five contacts of the contact set 123 are respectively multipled to the corresponding contacts of the second, third, fourth and fifth subsets of five contacts. Thus, the first contact of the set 121 is multipled to the sixth contact whereby the relay R150 is energized with the wiper 123 standing in engagement with either of these two contacts. Similarly the second and seventh contacts of the set 121 are multipled together so that the relay R145 is energized when the wiper 123 engages either of these two contacts. Hence, during operation of the switch 120 over a prolonged time interval, the relays R150, R145, R140, R135 and R130 operate in a cyclic manner successively to change the output frequency of the alternating voltage developed across the secondary winding 171 of the converter.

The arrangement is such that, when a cycle of operation of the enumerated interrupter relays is once started, the cycle is completed even though ground potential is removed from the start conductor C108 to open the operating circuit for the start relay R115. To this end, the above-mentioned holding circuit for the relay R115 is provided, this circuit extending from ground as connected to the wiper 124 through the multiple contacts of the contact set 122, and by way of RA118 and the winding of R115 to battery. With this arrangement, when the wiper 124 is stepped into engagement with its associated second contact, the above-traced holding circuit is completed. This circuit is maintained completed through the bridging wiper 124 and multipled second to fifth contacts of the set 122 until the wiper 124 is moved into engagement with its associated sixth contact, which contact corresponds to the beginning of the second cycle of operation of the interrupter relays. Similarly, if ground potential is removed from the start conductor C108 while the wipers 123 and 124 are traversing the wipers numbered from six to ten, the relay R115 is held energized over its holding circuit, which now extends by way of the bridging wiper 124 and the multipled seventh to tenth contacts of the contact set 122, until the wipers are moved into engagement with their respective associated eleventh contacts. Thus, the interrupter relays are caused to operate through a complete cycle each time the operation of the apparatus is initiated.

As indicated previously, the three relays R200, R210 and R215, in cooperation with the alarm device 280, are provided for the purpose of giving an audible signal or alarm in the event the converter fails to operate in its intended manner. Normally, the sequential operation of the two relays R200 and R210 causes the operating circuit for the signal device 280 to be opened before the relay R215 operates when the operation of the apparatus is initiated. During the transition intervals when the output frequency of the converter is being changed from one value to a different value, the secondary winding 171 of the transformer 170 is momentarily deenergized with the result that the relay R200 may restore for an instant. Due to the slow-to-release characteristic of the relay R210, however, the operating circuit for the device 280 is held open during such intervals even though the alternating current relay R200 restores. If, for some reason, the apparatus fails to operate properly, so that no alternating voltage is developed across the secondary winding 171 of the transformer 170, the relay R200 is deenergized and restores, or is not energized and remains in its restored position. As a consequence, the relay R210 is either caused to restore or to remain in its restored position. The relay R215, on the other hand, operates shortly following the operation of the start relay R115, and in the manner pointed out previously. With the relay R215 operated and the relay R210 restored, the operating circuit for the alarm device 280 is completed, this circuit extending from ground by way of RA211, RA216, and the windings of the alarm device 280 to battery. The resulting operation of the alarm device 280 serves to give an audible indication that the apparatus is not operating in its proper manner.

The release of the apparatus is effected in response to the removal of ground potential from the start conductor C108. As pointed out above, when ground potential is removed from this conductor, the start relay R115 is held in its operated position until the wipers of the rotary switch 120 are moved into engagement with the contacts corresponding to the start position for the next succeeding cycle. When the wipers reach this position the relay R115 is deenergized and restores. Upon restoring, the start relay R115 opens, at RA118, a further point in its holding circuit. At RA116, the relay R115 opens a point in the common portion of the operating circuits for the cyclically operating relays R100, R105 and R110, a point in the circuit for energizing the rotary switch operating magnet 119, and a point in the common portion of the operating circuits for the five interrupter relays. At RA117, the relay R115 opens a point in the common portion of the operating circuit for the slow-to-operate relay R215 and the start circuits for the various vibratory relays R220, R260, etc. The relay R215 now restores to open, at RA216, a point in the circuit for energizing the alarm device 280. When the respective start circuits for the various vibratory relays are interrupted, the amplitude of vibration of the weighted armatures respectively embodied therein gradually decreases until finally each of these armatures occupies its normal position intermediate the respective associated contact by way of which direct current pulses are delivered to the primary windings of the transformer 170. When the relay R115 restores, it also opens, at RA117, a point in the common portion of the circuits by way of which the direct current pulses are delivered to the indicated primary windings, thereby to terminate the alternating current output of the transformer 170. When the secondary winding 171 of this transformer is deenergized, the alternating current relay R200 is also deenergized and restores to open, at RA201, the operating circuit for the slow-to-release relay R210. The last-mentioned relay restores after an interval to prepare, at RA211, a point in the circuit for energizing the alarm device 280. Thus, the apparatus is entirely released and no further operation thereof occurs until ground potential is again impressed upon the start conductor C108.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A converter comprising, in combination, a transformer including a secondary winding and a pair of primary windings, a plurality of direct current pulse generators having different pulse periodicities, and cyclically operating means for successively connecting said primary windings to different ones of said generators, each of said generators, when connected to said primary windings, being operative to cause alternate current pulses to traverse alternate ones of said primary windings in directions such that an alternating voltage is developed across said secondary winding.

2. A converter comprising, in combination, a transformer including a secondary winding and a pair of primary windings, a plurality of direct current pulse generators having different pulse periodicities, a plurality of relays individually corresponding to said generators and each operative to connect said primary windings to the corresponding generator, an operating circuit for each of said relays, and cyclically operating means for sequentially completing said operating circuits, the operating circuit for each of said relays including break contacts controlled by the previously operated relay, thereby to prevent overlapping operation of said relays and each of said generators, when connected to said primary windings, being operative to cause alternate current pulses to traverse alternate ones of said primary windings in directions such that an alternating voltage is developed across said secondary winding.

3. A converter comprising, in combination, a transformer including a secondary winding and a pair of primary windings, a plurality of direct current pulse generators having different pulse periodicities, a plurality of output current conductors individually corresponding to said generators, each of said output current conductors being adapted to be connected to one terminal of said secondary winding, and means for successively connecting said primary windings to different ones of said generators and for simultaneously and successively connecting said one terminal of said secondary winding to corresponding ones of said conductors, each of said generators, when connected to said primary windings, being operative to cause alternate current pulses to traverse alternate ones of said primary windings in directions such that an alternating voltage is developed across said secondary winding.

4. A converter comprising, in combination, a transformer including a secondary winding and a pair of primary windings, a plurality of direct current pulse generators having different pulse periodicities a plurality of output current conductors individually corresponding to said generators, each of said output current conductors being adapted to be connected to one terminal of said secondary winding, a plurality of relays individually corresponding to said generators and said conductors, each of said relays being operative to connect said primary windings to the corresponding generator and substantially simultaneously to connect said one terminal of said secondary winding to the corresponding one of said conductors, an operating circuit for each of said relays, and cyclically operating means for sequentially completing said operating circuits, the operating circuit for each of said relays including break contacts controlled by the previously operated relay, thereby to prevent overlapping operation of said relays and each of said generators, when connected to said primary windings, being operative to cause alternate current pulses to traverse alternate ones of said primary windings in directions such that an alternating voltage is developed across said secondary winding.

5. A converter comprising, in combination, a transformer including a secondary winding and a pair of primary windings, a plurality of direct current pulse generators having different pulse periodicities, a plurality of output current conductors individually corresponding to said generators, each of said output current conductors being adapted to be connected to one terminal of said secondary winding, and means for successively connected said primary windings to different ones of said generators and for simultaneously and successively connecting said one terminal of said secondary winding to corresponding ones of said conductors, each of said generators, when connected to said primary windings, being operative to cause alternate current pulses to traverse alternate ones of said primary windings in directions such that an alternating voltage is developed across said secondary winding, an alarm device, an operating circuit for said alarm device, a relay connected to be energized by the alternating voltage developed across said secondary winding, and means controlled by said relay for completing said operating circuit only when all of said generators are conditioned for operation and no alternating voltage is developed across said secondary winding.

6. A converter comprising, in combination, a transformer including a secondary winding and a pair of primary windings, a plurality of direct current pulse generators having different pulse periodicities, a plurality of paths each including at least a portion of one or the other of said primary windings and extending from said primary windings to said generators, the impedance constants of said paths varying inversely in accordance with the periodicities of the generators to which said paths respectively extend, a plurality of output current conductors individually corresponding to said generators, each of said output current conductors being adapted to be connected to one terminal of said secondary winding, and means including said paths for successively connecting said primary windings to different ones of said generators and for simultaneously and successively connecting said one terminal of said secondary winding to corresponding ones of said conductors, each of said generators, when connected to said primary windings, being operative to cause alternate current pulses to traverse alternate ones of said primary windings in directions such that an alternating voltage is developed across said secondary winding.

7. A converter comprising, in combination, a transformer including a secondary winding and a pair of primary windings, a plurality of direct current pulse generators having different pulse periodicities, a plurality of paths each including at least a portion of one or the other of said primary windings and extending from said primary windings to said generators, the impedance constants of said paths varying inversely in accordance with the periodicities of the generators to which said paths respectively extend, a plurality of output current conductors individually corresponding to said generators, each of said output current conductors being adapted to be connected to one terminal of said secondary winding, means including said paths for successively connecting said primary windings to different ones of said generators and for simultaneously and successively connecting said one terminal of said secondary winding to corresponding ones of said conductors, each of said generators, when connected to said primary windings, being operative to cause alternate current pulses to traverse alternate ones of said primary windings in directions such that an alternating voltage is developed across said secondary winding, an alarm device, an operating circuit for said alarm device, a relay connected to be energized by the alternating voltage developed across said second winding, and means controlled by said relay for completing said operating circuit only when all of said generators are conditioned for operation and no alternating voltage is developed across said secondary winding.

8. A converter comprising, in combination, a transformer including a secondary winding and a pair of primary windings, a plurality of direct current pulse generators having different pulse periodicities, a plurality of output current conductors individually corresponding to said generators, each of said output current conductors being adapted to be connected to one terminal of said secondary winding and means for successively connecting different portion of said primary windings to different ones of said generators and for simultaneously and successively connecting said one terminal of said secondary winding to corresponding ones of said conductors, the impedance constants of said portions of said windings varying inversely in accordance with the periodicities of the generators to which said portions of said windings are successively connected, each of said generators, when connected to said primary windings, being operative to cause alternate current pulses to traverse alternate ones of said primary windings in directions such that an alternating voltage is developed across said secondary winding.

9. A converter comprising, in combination, a transformer including a secondary winding and a pair of primary windings, a plurality of direct current pulse generators having different pulse periodicities, a plurality of output current conductors individually corresponding to said generators, each of said conductors being adapted to be connected to one terminal of said secondary winding, means for successively connecting different portions of said primary windings to different ones of said generators and for simultaneously and successively connecting one terminal of said secondary winding to corresponding ones of said conductors, the impedance constants of said portions of said windings varying inversely in accordance with the periodicities of the generators to which said portions of windings are successively connected and each of said generators, when connected to said primary windings, being operative to cause alternate current pulses to traverse alternate ones of said primary windings in directions such that an alternating voltage is developed across said secondary winding.

10. A converter comprising, in combination, a transformer including a secondary winding and a pair of primary windings, a circuit including a direct current source for energizing one of said primary windings to produce voltage of one polarity across said secondary winding, said circuit comprising a plurality of branches individually including different portions of said one primary winding a second circuit also including a direct current source for energizing the other of said primary windings to produce voltage of the opposite polarity across said secondary winding, said second circuit comprising a plurality of branches individually corresponding to said first-mentioned branches and individually including different portions of said other winding, a plurality of output current conductors individually corresponding to said generators, each of said output current conductors being adapted to be connected to one terminal of said secondary winding, cyclically operating means for successively preparing the corresponding branches of said circuits and for simultaneously and successively connecting said one terminal of said secondary winding to corresponding ones of said conductors, and a plurality of circuit controlling devices individually corresponding to said branches and individually operative alternately to complete at different rates corresponding ones of said branches when the corresponding branches are prepared by said cyclically operating means.

11. In combination with converting apparatus operative to produce output voltages having different frequencies, a plurality of output current conductors individually corresponding to said frequencies, a plurality of relays individually corresponding to said conductors and individually operative to connect the corresponding conductors to said apparatus, an operating circuit for each of said relays, and cyclically operating means for sequentially completing said operating circuits, the operating circuit for each of said relays including break contacts controlled by the previously operated relay, thereby to prevent overlapping operation of said relays.

12. In combination with a converter operative to produce output voltages of different frequencies, a plurality of output current conductors individually corresponding to said frequencies, a plurality of devices each operative to change the output frequency of said converter and to connect the one of said conductors corresponding to the new output frequency to said converter, and cyclically operating means operative to cause the sequential operation of said devices.

13. In combination with a converter operative to produce output voltages of different frequencies, a plurality of output current conductors individually corresponding to said frequencies, a plurality of relays each operative to change the output frequency of said converter and to connect the one of said conductors corresponding to the new output frequency to said converter an operating circuit for each of said relays, and cyclically operating means for sequentially completing said operating circuits, the operating circuit for each of said relays including break contacts controlled by the previously operated relay, thereby to prevent overlapping operation of said relays.

CLARENCE E. LOMAX.